(12) United States Patent
Maki (10) Patent No.: US 9,639,312 B2
(45) Date of Patent: May 2, 2017

(54) IMAGE PROCESSING APPARATUS FOR PERFORMING PROCESSING ON A PRINT JOB, CONTROL METHOD AND STORAGE MEDIUM OF THE SAME (75) Inventor: Nobuhiko Maki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/568,793

(22) Filed: Aug. 7, 2012

(65) Prior Publication Data

US 2013/0038903 A1 Feb. 14, 2013

(30) Foreign Application Priority Data

Aug. 11, 2011 (JP) ................................. 2011-176046

(51) Int. Cl.
G06K 15/00 (2006.01)
G06F 3/12 (2006.01)
H04N 1/40 (2006.01)
H04N 1/46 (2006.01)
G06K 15/02 (2006.01)

(52) U.S. Cl.
CPC .......... G06F 3/1274 (2013.01); G06F 3/1204 (2013.01); G06F 3/1267 (2013.01); G06F 3/1285 (2013.01); G06K 15/005 (2013.01); G06K 15/4095 (2013.01); G06F 3/1222 (2013.01); G06F 3/1238 (2013.01); G06K 15/1817 (2013.01)

(58) Field of Classification Search
CPC .......... G06Q 10/107; H04N 2201/3219; G06F 17/30011
See application file for complete search history.

(56) References Cited

U.S. PATENT DOCUMENTS

| | | | | |
|---|---|---|---|---|
| 2002/0105666 A1* | 8/2002 | Sesek | .................... | G06F 21/608 358/1.14 |
| 2003/0233411 A1* | 12/2003 | Parry et al. | .................... | 709/206 |
| 2005/0144561 A1* | 6/2005 | Moody et al. | ................ | 715/739 |
| 2008/0297839 A1* | 12/2008 | Kayama | ................ | G06F 3/1204 358/1.15 |
| 2010/0220349 A1* | 9/2010 | Ogura et al. | ................. | 358/1.14 |

FOREIGN PATENT DOCUMENTS

| | | |
|---|---|---|
| CN | 101662555 A | 3/2010 |
| CN | 101859354 A | 10/2010 |
| JP | 11-31061 A | 2/1999 |
| JP | 2001-251454 A | 9/2001 |
| JP | 2003-228262 A | 8/2003 |
| JP | 2011-060239 A | 3/2011 |

* cited by examiner

Primary Examiner — Thomas Lett
(74) Attorney, Agent, or Firm — Canon USA, Inc. IP Division (57) ABSTRACT An image processing apparatus includes a storage unit that stores a plurality of print jobs, a job reception unit that receives a print job selected from the plurality of print jobs stored in the storage unit, an operation-type reception unit that receives an operation type of the print job when the selection of the print job is received, and a selection unit that automatically selects the print job as an operational target from the plurality of print jobs based on the operation type received by the operation-type reception unit.

7 Claims, 8 Drawing Sheets

| RECEPTION NO. | TIME | JOB NAME | USER NAME | JOB TYPE | JOB PASSWORD | STATUS |
|---|---|---|---|---|---|---|
| 0001 | 16:10 | Document1 | User1 | SECURE PRINT | 123 | WAITING FOR AUTHENTICATION |
| 0002 | 16:20 | Document2 | User1 | SECURE PRINT | 123 | WAITING FOR AUTHENTICATION |
| 0003 | 16:30 | Document3 | User2 | SECURE PRINT | 456 | WAITING FOR AUTHENTICATION |
| 0004 | 16:40 | Document4 | User3 | SECURE PRINT | 789 | WAITING FOR AUTHENTICATION |
| 0005 | 16:50 | Document5 | User1 | SECURE PRINT | 123 | WAITING FOR AUTHENTICATION |

| SELECT | RECEPTION NO. | TIME | JOB NAME | USER NAME | STATUS |
|---|---|---|---|---|---|
| ☑ 1 | 0001 | 16:10 | Document1 | User1 | WAITING FOR AUTHENTICATION |
|  | 0002 | 16:20 | Document2 | User1 | WAITING FOR AUTHENTICATION |
|  | 0003 | 16:30 | Document3 | User2 | WAITING FOR AUTHENTICATION |
|  | 0004 | 16:40 | Document4 | User3 | WAITING FOR AUTHENTICATION |
| ☑ 2 | 0005 | 16:50 | Document5 | User1 | WAITING FOR AUTHENTICATION |

SECURE PRINT JOB STATUS

[PRINT] [CANCEL]

IMAGE PROCESSING APPARATUS FOR PERFORMING PROCESSING ON A PRINT JOB, CONTROL METHOD AND STORAGE MEDIUM OF THE SAME

BACKGROUND OF THE INVENTION

Field of the Invention

The present invention relates to an image processing apparatus that performs various processing on a print job.

Description of the Related Art

Recently, a function is realized in an image processing apparatus such as a printer or a multifunction peripheral (MFP). In the function, a print job received from a host computer (a personal computer (PC), etc.) is temporarily stored, and the stored print job is selected and print thereof is instructed by an operator, thereby starting the print. The function is aimed at preventing information leakage by a printed matter being left on a sheet discharge tray of a printer, or a mistake to take the printed matter. Further, a job stored in the apparatus can be canceled (deleted) without print. Therefore, when the host computer carelessly instructs the print or when the print is not required after instructing the print, there is also an effect to prevent wasting sheets. The function is generally referred to as "secure print", "spool print", or "secret print". Hereinbelow, the function is referred to as "secure print", and a job used by the function is referred to as a "secure print job".

It is troublesome for the operator to select secure print jobs stored in a print apparatus one by one. Therefore, there is also a function for automatically selecting the jobs as an operation target according to a predetermined condition to omit the operation. In the automatic selection according to the predetermined condition, the operator selects only one secure print job, resulting in selecting all secure print jobs with a user identification (ID) same as that of the selected job. Additionally, there is a function for automatically selecting all secure print jobs with the user ID same as that of a log-in operator when the operator logs in the print apparatus.

Japanese Patent Application Laid-Open No. 11-31061 discusses a print method using automatic selection of a job for printing all jobs with a user identification (ID) or a personal identification number (PIN) code, input to a print apparatus by an operator, matching a user ID or a PIN code added to the print job.

As discussed in Japanese Patent Application Laid-Open No. 11-31061, when using the automatic selection of the job, in both cases of printing and canceling a secure print job, all jobs matching a certain predetermined condition are operation target. In other words, the selection of a job as an operation target cannot be changed depending on an operation purpose.

With the conventional print method, it is not possible to perform flexible selection such as canceling only the selected job if the operator selects the secure job to cancel printing or automatically selecting and printing the job of the operator if the operator selects the secure job to print.

SUMMARY OF THE INVENTION

An aspect of the present invention is directed to improving the operability by switching a job selection operation depending on an operation purpose of a print job.

According to an aspect of the present invention, an image processing apparatus includes an operation unit configured to receive selection of a print job and to receive selection of a type of operation on a print job from an operator, and a control unit configured to change an operation target job, based on the print job and the type of job operation received by the operation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
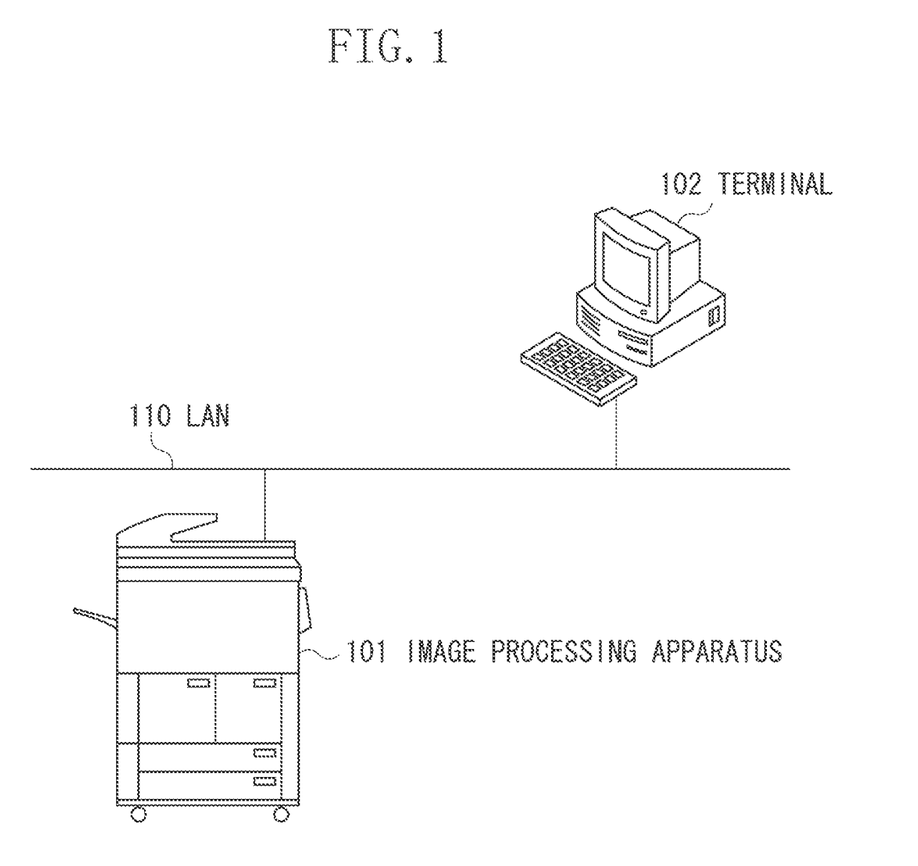
FIG. 1 illustrates a configuration of a print system.

A description will be first given of a configuration example of a print system according to the present exemplary embodiment with reference to FIG. 1. Referring to FIG. 1, an image processing apparatus 101 and a terminal 102 are connected to the print system via a local area network (LAN) 110 according to the present exemplary embodiment. The image processing apparatus 101 includes at least a print function for executing a print job, and receives print data from the terminal 102 or other devices and performs print processing. The terminal 102 is, e.g., a PC, and generates the print data by a printer driver installed to the terminal 102, and instructs the print to the image processing apparatus 101 based on the generated print data.

The terminal 102 is connected to the LAN 110 in FIG. 1. However, the present invention is not limited to this and other connection configurations may be used. The print system in FIG. 1 may include a plurality of apparatuses including the identical function to that of the image processing apparatus 101 or the terminal 102.

Figure 2:
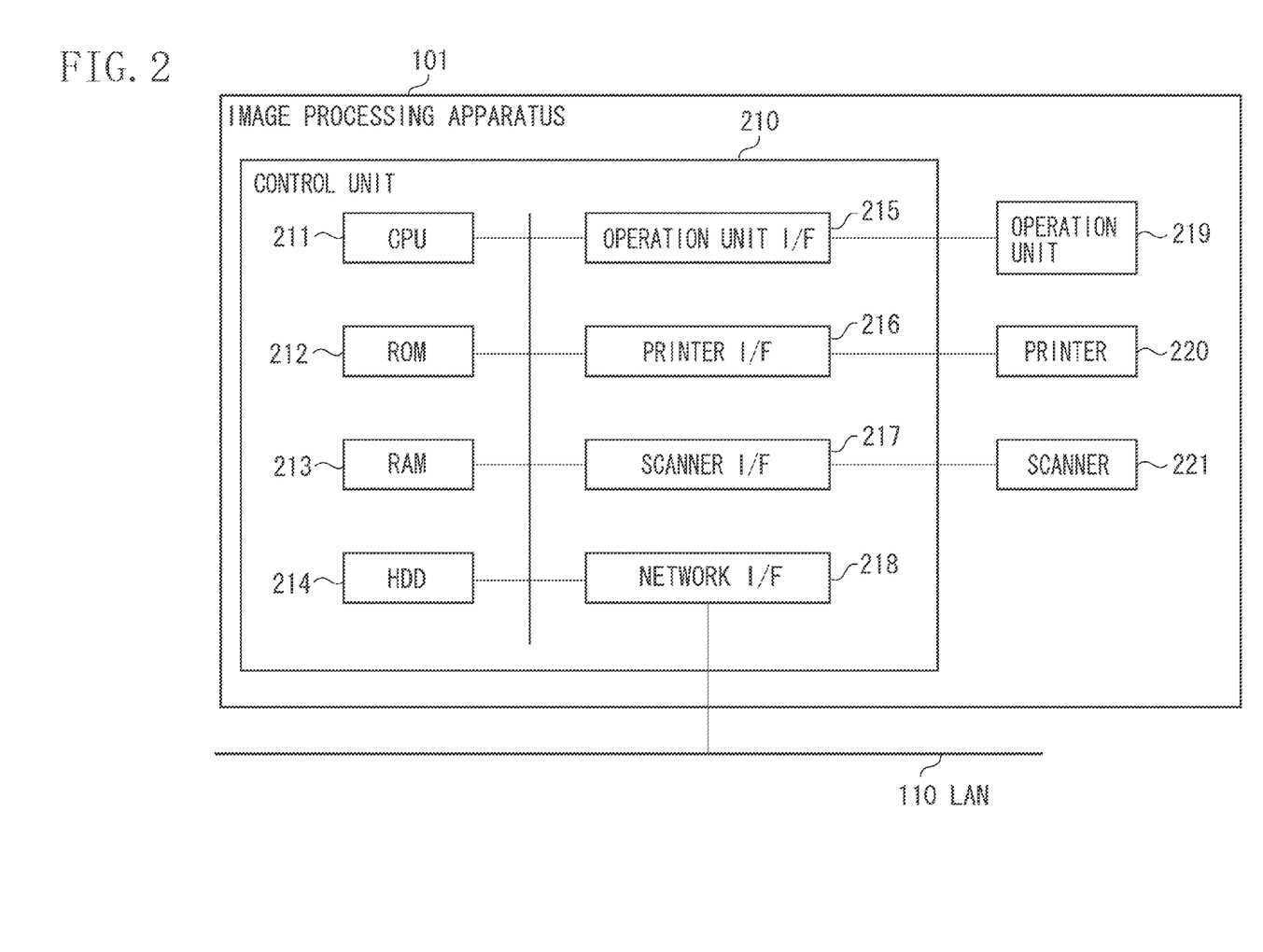
FIG. 2 illustrates a block diagram of a hardware configuration of a print apparatus.

Next, a description will be given of a hardware configuration of the image processing apparatus 101 with reference to FIG. 2. The image processing apparatus 101 includes a control unit 210, an operation unit 219, a printer 220, and a scanner 221 as a hardware configuration. The control unit 210 includes a central processing unit (CPU) 211, a read-only memory (ROM) 212, a random access memory (RAM) 213, a hard disk drive (HDD) 214, an operation unit interface (I/F) 215, a printer I/F 216, a scanner I/F 217, and a network I/F 218.

The control unit 210 including the CPU 211 integrally controls the operation of the entire image processing apparatus 101. The CPU 211 reads a control program stored in the ROM 212 and performs various controls such as a reception control and a print control. The RAM 213 is used as a temporary storage area for a main memory of the CPU 211 or a work area. The HDD 214 stores image data, various programs, and various information tables. The operation unit I/F 215 connects the operation unit 219 to the control unit 210. The operation unit 219 includes a liquid crystal display unit having a touch panel function or a keyboard.

The printer I/F 216 connects the printer 220 to the control unit 210. Image data to be printed by the printer 220 is transferred via the printer I/F 216 from the control unit 210, and is printed on a recording medium by the printer 220. The scanner I/F 217 connects the scanner 221 to the control unit 210. The scanner 221 reads an image on a document, outputs image data, and inputs the data to the control unit 210 via the scanner I/F 217. The network I/F 218 connects the control unit 210 (the image processing apparatus 101) to the LAN 110. The network I/F 218 transmits the image data or information to an external device on the LAN 110 or receives various information from the external device on the LAN 110.

Figure 3:
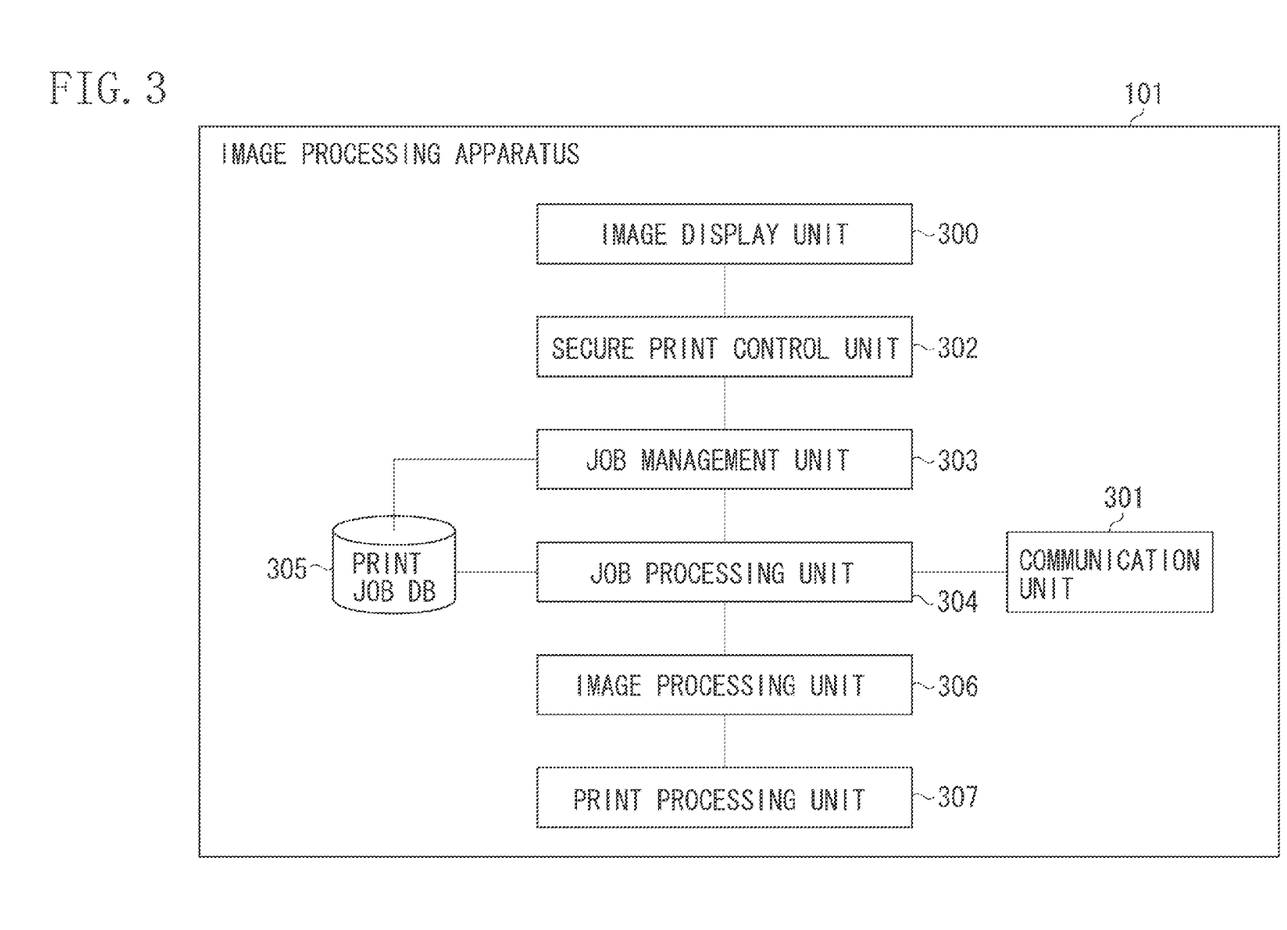
FIG. 3 illustrates a software configuration of the print apparatus.

A description will be given of a software configuration of the image processing apparatus 101 with reference to FIG. 3. Each functional unit in FIG. 3 is realized by reading the control program from the ROM 212 or the HDD 214 to the RAM 213 and executing the read program by the CPU 211 of the image processing apparatus 101. The image processing apparatus 101 includes the following software configuration. Specifically, the image processing apparatus 101 includes a screen display unit 300, a communication unit 301, a secure print control unit 302, a job management unit 303, a job processing unit 304, a print job database 305, an image processing unit 306, and a print processing unit 307. The print job database 305 is abbreviated as a print job DB.

In the following description, the "print job" means a job for executing image print based on the image data. The "secure print job" means that the image data is temporarily stored to the HDD 214 of the image processing apparatus 101 and the print of the print job is executed in response to an instruction of an operator of the image processing apparatus 101. Further, a "normal print job" means a print job for executing the normal print, in other words, immediately executing the print, and can be used for comparison with the secure print job.

The screen display unit 300 displays a screen for executing an operation of the secure print job on the operation unit 219. The screen display unit 300 instructs to execute the secure print job to the secure print control unit 302 in response to the instruction from the operator. The communication unit 301 receives the print job sent from the terminal 102 via the network I/F 218, and sends the print job to the job processing unit 304.

The secure print control unit 302 receives an instruction, from the screen display unit 300, to obtain a list of the secure print jobs, and then obtains attribute information of the job from the job management unit 303, and requests to the job management unit 303 to execute an operation in response to the instruction of the operation on the job.

The job management unit 303 manages the attribute information of the print job stored in the print job DB 305 and the image data of the print job.

The job processing unit 304 performs various processing on the print job received from the communication unit 301. If the print job is the secure print job, the print job is stored to the print job DB 305.

The print job DB 305 stores the attribute information of the print job and the image data of the print job. The details of the print job DB 305 are described with reference to FIG. 5.

The image processing unit 306 performs image processing of the image data of the print job in response to an instruction from the job processing unit 304.

The print processing unit 307 receives the image data of the print job subjected to image processing for print by the image processing unit 306, and allows the printer 220 to execute the print on the recording medium via the printer I/F 216.

A description will be given of a processing sequence when the image processing apparatus 101 receives the print job according to the present exemplary embodiment with reference to FIG. 4. The following processing is realized by reading the control program from the ROM 212 or the HDD 214 to the RAM 213 and executing the read program by the CPU 211 of the image processing apparatus 101.

In step S401, the communication unit 301 receives the print job sent from the terminal 102 via the network I/F 218, and transmits the received print job to the job processing unit 304. Here, the received print job includes attribute information such as a job name, a user name (user identification (ID)), and a job type (secure print job or general print job) in relation to the image data. Further, if the job type indicates the secure print job, a job password is provided as the attribute information in addition to the above attribute information.

In step S402, the job processing unit 304 determines the job type (the secure print job or the normal print job) of the print job receiving from the communication unit 301. If the job processing unit 304 determines that the received job is the secure print job in step S402, the processing advances to step S403.

In step S403, the job processing unit 304 registers the attribute information to the print job DB 305 and stores the image data. The print of image data stored in the HDD 214 is allowed to wait until receiving input of the job password from the operator.

A description will be given of a job management table registered in the print job DB 305 with reference to FIG. 5.

The image processing apparatus 101 uniquely assigns a reception number 501 to the print job received by the job processing unit 304. At a time 502, the print job is received from the terminal 102. In a job name 503, a user name (user ID) 504, a job type 505, and a job password 506, each of the attribute information included in the print job received in step S401 is stored. A status 507 indicates statuses ("waiting for authentication", "during printing", "waiting for printing", and "during canceling") of the print job.

In the "waiting for authentication" status, the print job is the secure print job, and an input of the job password of the operator is waited. When the operator inputs a correct job password, the print job of the job password transits from the "waiting for authentication" status to the "during printing" or "waiting for printing" status.

The "during printing" status means that the print job is in progress of execution. The print job is executed and the print of the image ends. Then, an entry of the print job is deleted from the job management table.

The "waiting for printing" status means a status of waiting for the printing since another print job is in progress of execution. In the "waiting for printing" status, the print of the image data of the print job is waited. However, the image processing unit 306 may perform various image processing.

In the "during cancel" status, the operator instructs to cancel the print, thereby transiting to the status. In the "during cancel" status, processing such as deletion of the image data is in progress of execution to cancel the execution of the print job. The status of the print job is changed to "during cancel". Then, when the execution of the print job is canceled, the entry of the print job is deleted from the job management table.

Figure 4:
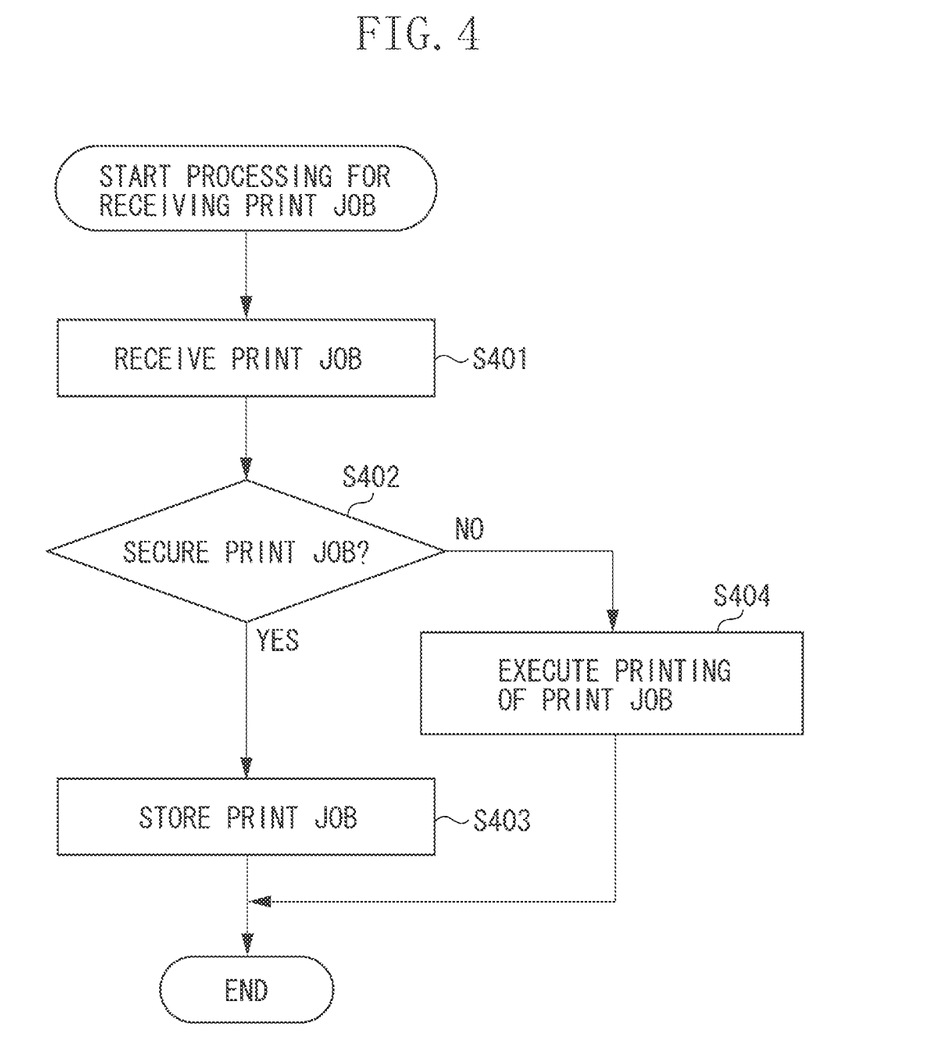
FIG. 4 illustrates a flowchart of a processing sequence for receiving a print job from a terminal.

The description is back to FIG. 4. In step S402, the job processing unit 304 determines that the received job is the normal print job. Then, the processing advances to step S404.

In step S404, the job processing unit 304 registers the attribute information to the print job DB 305, similarly to step S403. The job processing unit 304 stores, to the print job DB 305 as the "waiting for printing" status, the image data of the print job received in step S401.

The image data of the print job is sent to the image processing unit 306, and image processing for print is requested. The image processing unit 306 that receives the request of the image processing performs proper image processing. Then, the image processing unit 306 checks that there are not other print jobs that is in the "during printing" status, and then sends the image data to the print processing unit 307, and requests the print processing on the recording medium. The print processing unit 307 that receives the request executes the print on the recording medium with the printer 220 via the printer I/F 216. Then, the processing of the flowchart ends.

A description will be given of a processing sequence according to the operation of the secure print job with the image processing apparatus 101 with reference to FIG. 6. The following processing is realized by reading the control program from the ROM 212 or the HDD 214 to the RAM 213 and executing the read program by the CPU 211 of the image processing apparatus 101. Before starting the processing sequence in FIG. 6, the screen display unit 300 displays a status screen of the secure print job obtained via the secure print control unit 302. FIG. 7 illustrates a screen for displaying the status of the secure print job.

Referring to FIG. 7, a secure print job status screen 701 displays the status of the secure print job. A field 702 displays the list of the secure print jobs stored in the image processing apparatus 101. The list of the secure print jobs is displayed based on the job management table in FIG. 5. Specifically, among the print jobs managed by the job management table in FIG. 5, the status 507 indicates the print job (i.e., the secure print job that is not printed yet) for "waiting for authentication".

The operator selects the secure print job and then performs the printing operation of the job with a print button 703. With a cancel button 704, the print is cancelled, and the job is canceled after the operator selects the secure print job similarly to the print button 703. The print button 703 and the cancel button 704 are pressed only when at least one job from the list of jobs displayed in the field 702 is selected.

Numerals 705 and 706 indicate statuses in which the operator selects the secure print job. Numbers in the numerals 705 and 706 indicate the order for selecting the job on the screen in FIG. 7 by the operator. In an example in FIG. 7, the numeral 705 indicates that the operator first selects the secure print job of a reception number 0001. The numeral 706 indicates that the operator secondly selects the secure print job of a reception number 0005.

According to the present exemplary embodiment, referring to FIG. 7, one operator can select the secure print jobs with a different user name. For example, one operator can simultaneously select secure print jobs of User1 and User2. However, occasionally it is not advisable to allow operation of the secure print job on another operator in view of preventing information leakage and preventing a mistake in taking a printed matter. In this case, a user log-in environment is configured such that the operator may input a user ID and then may become able to operate the image processing apparatus 101, and only the job of the log-in operator may be displayed as a selectable job in FIG. 7.

Figure 6:
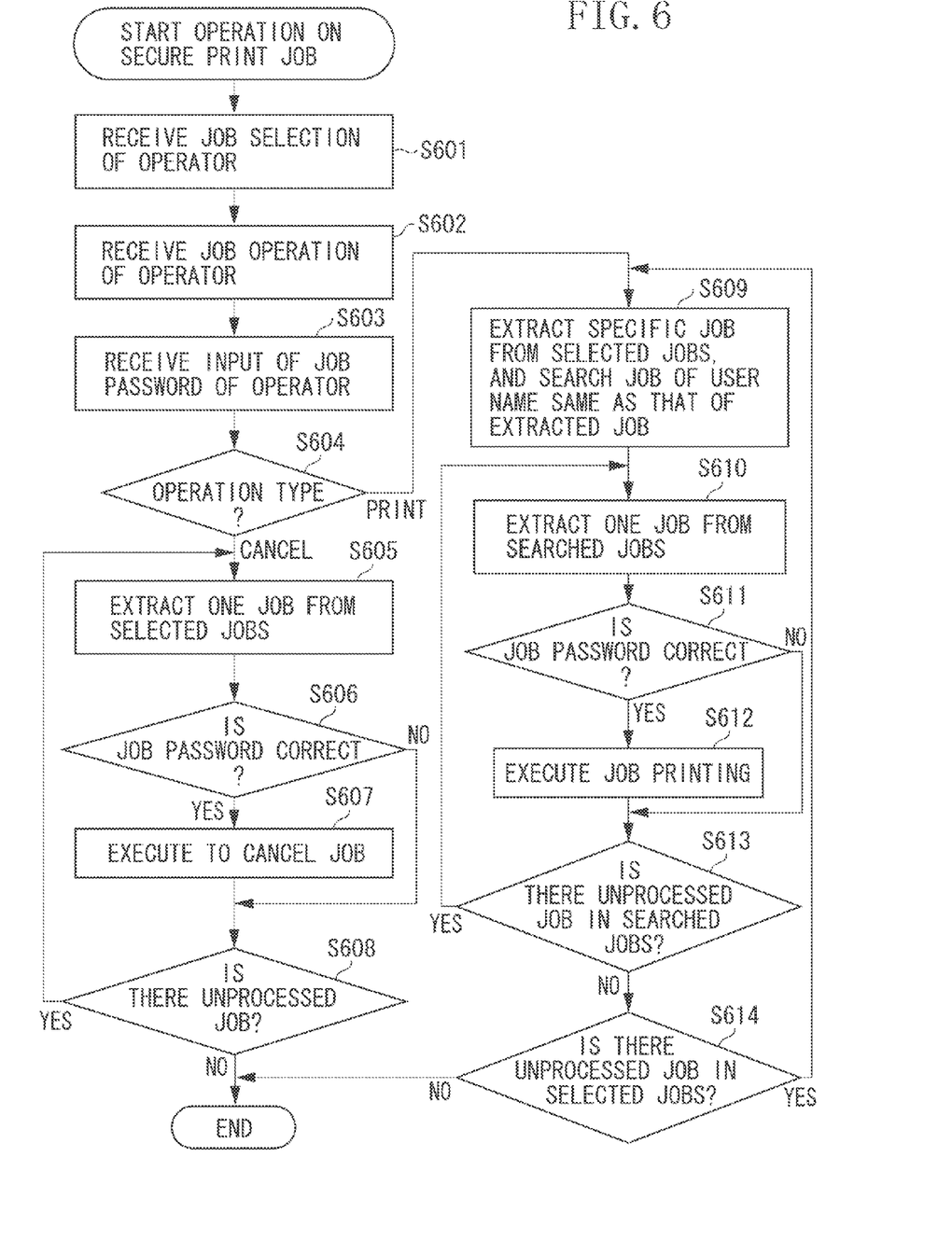
FIG. 6 illustrates a flowchart of a processing sequence according to an operation of a secure print job.
Figure 7:
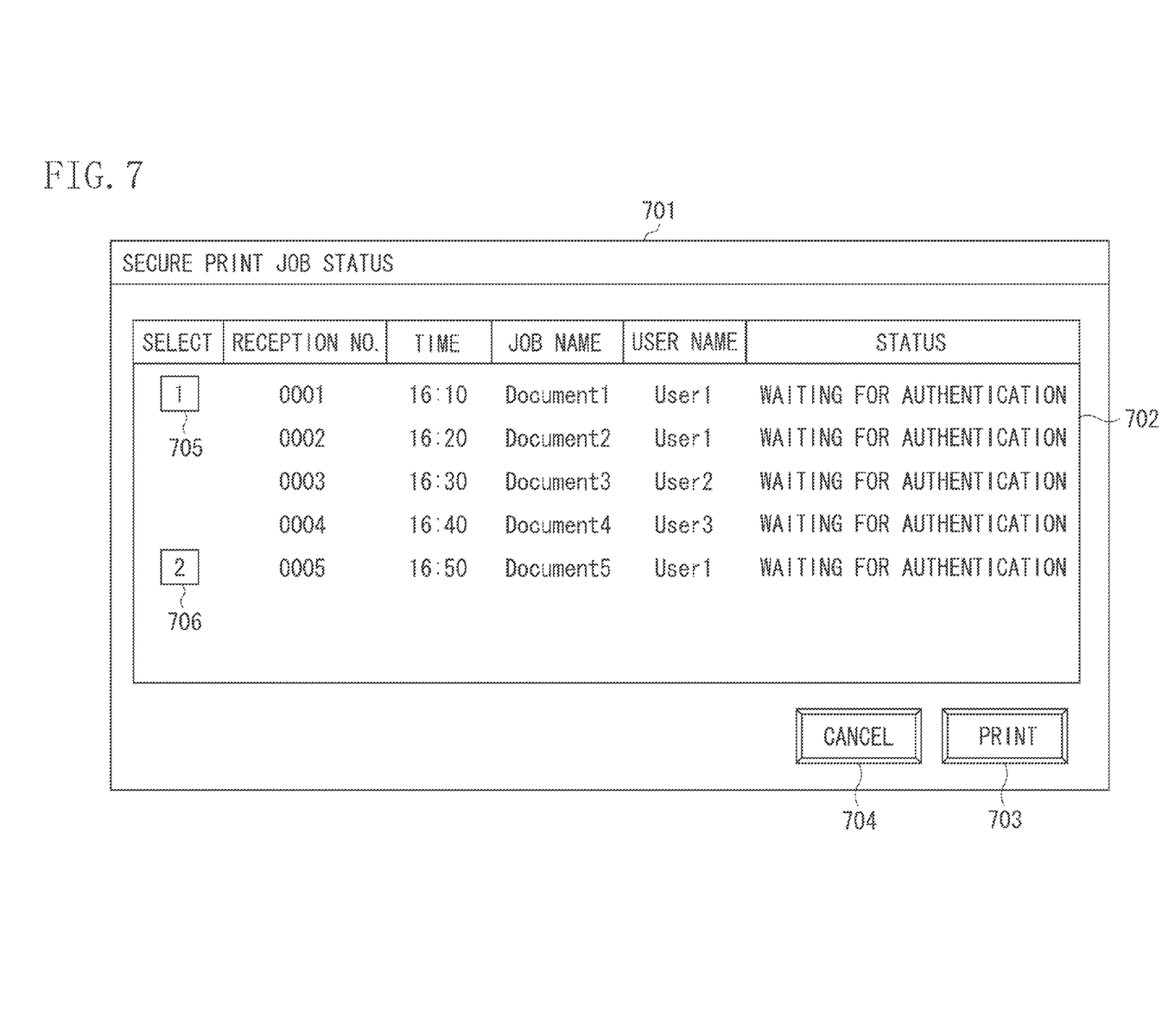
FIG. 7 illustrates an example of a screen for displaying a status of secure print job.

The description is back to FIG. 6.

In step S601, the screen display unit 300 receives one or a plurality of the secure print jobs selected by the operator as a processing target job. If the operator selects the plurality of the secure print jobs in step S601, the screen display unit 300 receives information on the order of selecting the jobs by the operator. In the example in FIG. 7, the screen display unit 300 receives the jobs of the reception numbers 0001 and 0005, and receives information indicating that the operator first selects the job of the reception number 0001 and secondly selects the job of the reception number 0005.

In step S602, the screen display unit 300 receives the operation type of the secure print job. Referring to FIG. 7, if the operator presses the print button 703, the screen display unit 300 receives the print operation and, if the operator presses the cancel button 704, the screen display unit 300 receives the cancel operation.

In step S603, the screen display unit 300 displays a job password input screen (not illustrated) to receive a job password input by the operator. Thereafter, the screen display unit 300 transmits, to the secure print control unit 302, information on the secure print job (and information on the order of jobs) received in step S601, information on the operation type received in step S602, and the job password received in step S603.

In step S604, the secure print control unit 302 determines, based on the information received from the screen display unit 300, whether the operator instructs the print processing or the print cancel processing on the secure print job. If determining that the operator instructs the print cancel processing in step S604, the processing advances to step S605. If determining that the operator instructs the print processing in step S604, the processing advances to step S609.

In step S605, the secure print control unit 302 arbitrarily extracts one of the jobs in which processing in steps S606 and S607 is not performed among the secure print jobs selected by the operator in step S601, based on the information received from the screen display unit 300. According to the present exemplary embodiment, the job of the reception number 0001 is first extracted.

Figure 5:
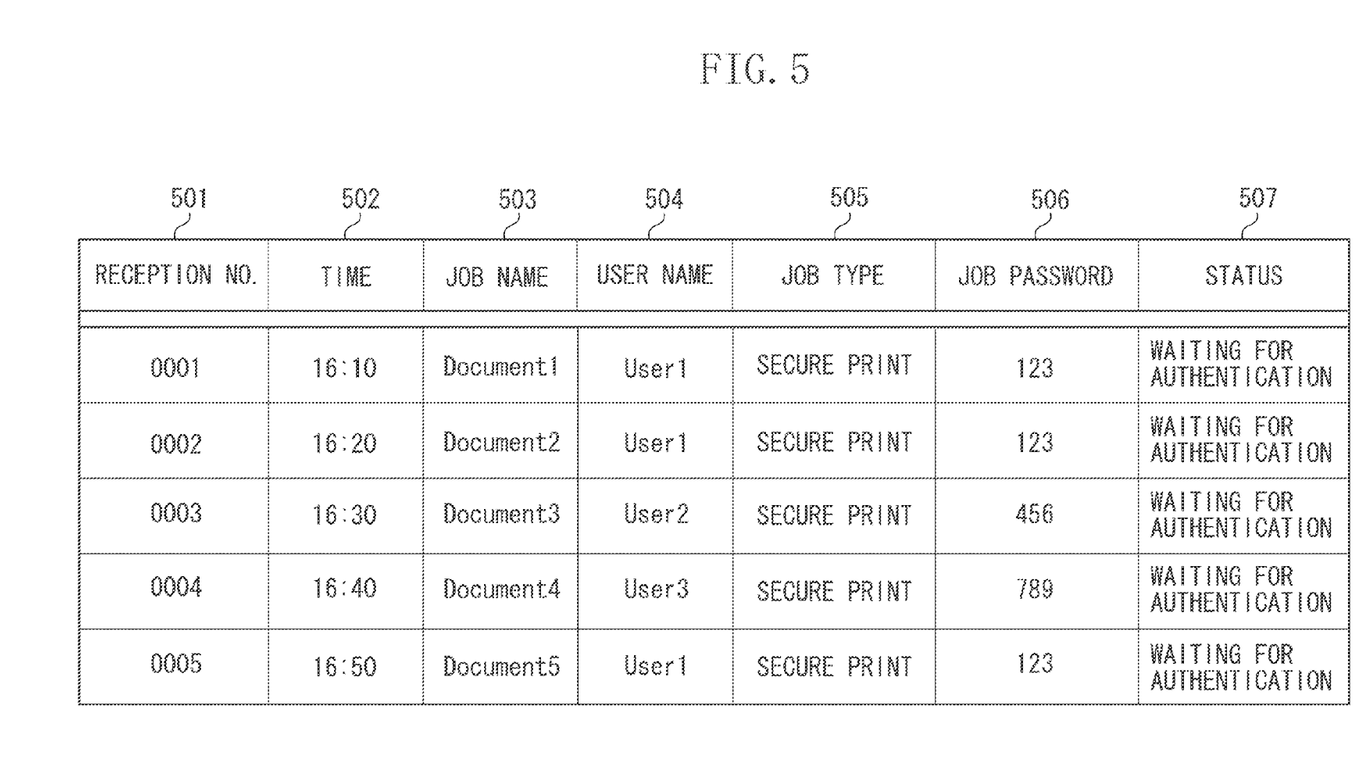
FIG. 5 illustrates an example of a job management table managed by the print apparatus.

In step S606, the secure print control unit 302 obtains the job password 506 of the job extracted in step S605 from the job management table in FIG. 5, and compares the obtained job password 506 with the job password received in step S603. The job password 506 of the reception number 0001 obtained from the job management table indicates "123", and the job password 506 is compared with the job password received in step S603. If the job password 506 matches the job password received in step S603 (YES in step S606), the processing advances to step S607. If the job password 506 does not match the job password received in step S603 (NO in step S606), the processing advances to step S608.

According to the present exemplary embodiment, if the job password 506 does not match the job password received in step S603 (NO in step S606), the processing advances to step S608 as mentioned above. According to a modification of the present exemplary embodiment, if the job passwords do not match each other (NO in step S606), the operation unit 219 may display a screen (not illustrated) capable of receiving the input of the job password from the operator again, and the determination in step S606 may be repeated.

In step S607, the secure print control unit 302 requests to execute job cancel to the job management unit 303. The job management unit 303 that receives the request changes the status 507 of the job in the job management table in FIG. 5 from "waiting for authentication" to "during cancel". Further, the cancel execution of the job is requested to the job processing unit 304. Then, at the completion of the cancel operation, the job management unit 303 deletes the entry of the job from the job management table in FIG. 5, and notifies the secure print control unit 302 of the completion of the job cancel.

In step S608, the secure print control unit 302 determines whether there is a job in which processing in step S606 and S607 is not performed among the secure print jobs selected by the operator. If the secure print control unit 302 determines that there is the job unprocessed in step S606 and S607 (YES in step S608), the processing returns to step S605. Then, the processing is repeated. For example, if the job of the reception number 0005 is unprocessed, the processing in step S606 is repeated for the job of the reception number 0005. If the secure print control unit 302 determines that there is not the unprocessed job in step S606 and S607 (NO in step S608), it is notified to the screen display unit 300 that all processing is completed, and the processing thereafter ends.

According to the present exemplary embodiment, if the secure print control unit 302 determines that there is the unprocessed job (YES in step S608), the processing only returns to step S605 as described above. According to a modification of the present exemplary embodiment, even if the secure print control unit 302 determines that there is the unprocessed job (YES in step S608), when the user name is different between the unprocessed job and the job subjected to cancel processing, the determination in step S608 may be NO. As a consequence, if the operator selects a plurality of jobs having different user names, only selected one of the plurality of jobs can be subjected to the print cancel. With the configuration, it is advantageous that the operation unit 219 displays a screen to inform that only selected one of the plurality of jobs is subjected to the print cancel or to warn, to a user, the reception number of the job that is not subjected to the print cancel.

In step S604, the secure print control unit 302 determines that the operation type received from the screen display unit 300 is the print operation. Then, the processing advances to step S609.

In step S609, the secure print control unit 302 specifies one of the secure print jobs selected by the operator based on the information received from the screen display unit 300. Specifically, the secure print control unit 302 specifies the job first selected by the operator. In the example in FIG. 7, the secure print control unit 302 specifies the job of the reception number 0001 added with the numeral 705. If the number of the secure print jobs received from the screen display unit 300 is one, the present secure print job is obviously specified.

Further, the secure print job with the user name same as the user name (user ID) of the job first selected by the operator is extracted from the job management table in FIG. 5. In the example in FIG. 7, the job first selected by the operator is the secure print job of the reception number 0001, and the user name of the job is User1. Therefore, the secure print job with the user name User1 is all searched from the job management table in FIG. 5. Specifically, the jobs of the reception numbers 0001, 0002, and 0005 with the user name 504 as User1 are specified as jobs of operation targets.

In step S610, the secure print control unit 302 arbitrarily extracts one unprocessed job in the list of jobs searched in step S609.

Processing in step S611 is similar to that in step S606. If the job passwords do not match each other, the processing proceeds to step S613. In this case, it is notified, to the operator, that the searched and extracted job is not printed because the job passwords do not match each other in step S611 (NO in step S611) and the reception number of the job with the display on the operation unit 219. If the job passwords match each other in step S611 (YES in step S611), the processing advances to step S612.

In step S612, the secure print control unit 302 requests to execute the print of the print job extracted in step S610 to the job management unit 303. The job management unit 303 receiving the request changes the status 507 of the print job in the job management table in FIG. 5 from "waiting for authentication" to "waiting for printing". Then, the processing is similar to that in step S404 in FIG. 4 and, if there is no other print job indicating the "during printing" status anymore, the print job extracted in step S610 is changed from "waiting for printing" to "during printing", and the print execution of the job is requested to the job processing unit 304. At the completion of the print operation of the print processing unit 307, the job management unit 303 deletes the entry of the job from the job management table in FIG. 5, and notifies the secure print control unit 302 of the print completion of the job.

In step S613, the secure print control unit 302 determines whether there is a job in which process in steps S611 and in S612 is not performed in the list of jobs searched in step S609. If the secure print control unit 302 determines that there is the job in which the process in step S611 and S612 is not performed in the list of jobs (YES in step S613), the processing returns to step S610. Then, the processing is repeated. In the example in FIG. 7, the jobs of the reception numbers 0001, 0002, and 0005 with the user name User1 are searched in step S609. Therefore, the processing in step S611 (or step S612) is repeated to all jobs. If all jobs searched in step S609 are subjected to the processing in step S611 (or step S612), the processing proceeds to step S614.

In step S614, the secure print control unit 302 determines whether there is an unprocessed job in the jobs selected in step S601. If the secure print control unit 302 determines that there is the unprocessed job in the jobs selected in step S601 (YES in step S614), the processing returns to step S609. Then, the unprocessed job secondly or subsequently selected by the operator is subjected to the processing in step S610 again. If the secure print control unit 302 determines that there is no unprocessed job in the jobs selected in step S601 (NO in step S614), it is notified to the screen display unit 300 that all processing is completed. Thereafter, the processing in the flowchart ends. In the example in FIG. 7, both the job of the reception number 0001 first selected by the operator and the job of the reception number 0005 secondly selected have been already subjected to the print processing. As a consequence, the determination in step S614 is "NO".

According to the present exemplary embodiment, in step S614, it is determined whether there is the unprocessed job in the jobs selected by the operator as described above. However, when determining in step S614 that there is the unprocessed job in the jobs selected by the operator (YES in step S614), only the operator actually selects a plurality of the secure print jobs with different user names in step S601. If YES in step S614, it may be warned that the operator selects a plurality of the secure print jobs with different user names or the print execution may be canceled to prevent the information leakage or prevent making a mistake to take a printed matter. Alternatively, the processing in step S614 may not be performed. With the configuration, when the operator selects a plurality of the secure print jobs with different user names, it is limited to execute jobs with the user name different from that of the first selected job.

According to the present exemplary embodiment, when the operator selects the print processing as an operation type of the secure print job, the job with user name or job password matching is automatically selected, as well as the job selected by the operator, and the job is then printed. At this time, in order to prevent the user from being confused, the automatically selected job may be displayed to be capable of being identified on the screen in FIG. 7.

A description will be given of an example of a status screen of the print job whose execution is requested in step S612 or S404 with reference to FIG. 8. The job management unit 303 extracts the status 507 of the print job in the job management table in FIG. 5, indicating the attribute information on the print job in the "during printing" or "waiting for printing" status. The screen display unit 306 displays the screen in FIG. 8.

A job status screen 801 displays the status of the print job whose execution is requested in step S612 or S404. A field 802 displays a list of the print jobs in the "during printing" or "waiting for printing" status stored in the image processing apparatus 101. The list of secure print jobs is displayed based on the job management table in FIG. 5. Specifically, the print job in the "during printing" or "waiting for printing" status indicated by the status 507 is extracted and displayed from the print jobs managed by the job management table in FIG. 5.

A cancel button 804 is used for canceling the print.

The operator can select one of the print jobs in the "waiting for printing" status from the field 802 indicating the list. The cancel button 804 is pressed on the screen in FIG. 8, thereby canceling the execution of the print job. Specifically, the job management unit 303 changes the status 507 of the job in the job management table in FIG. 5 from "waiting for printing" to "during cancel", and requests to execute the cancel of the print job to the job processing unit 304. Thereafter, the job management unit 303 deletes the entry of the job from the job management table in FIG. 5 at the completion of the cancel operation.

According to the present exemplary embodiment, when the operator instructs the print processing as the operation type on the secure print job, other secure print jobs with the user name or job password matching are automatically selected in addition to the job selected by the operator, and the selected secure print jobs are printed.

Figure 8:
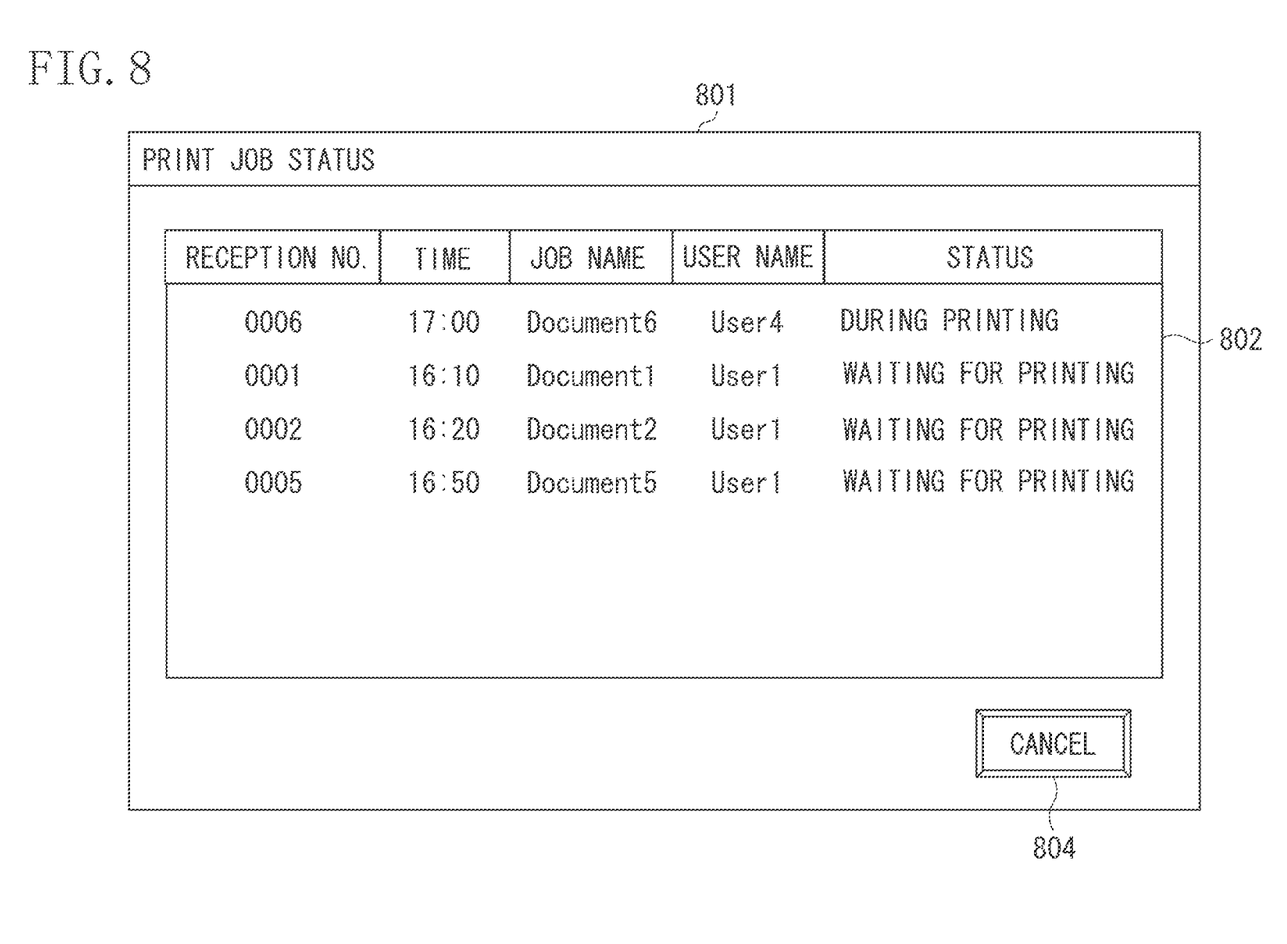
FIG. 8 illustrates an example of a screen for displaying a print job status.

Further, if the print job that is not selected by the operator but is automatically selected is to be then canceled in print, the cancel can be instructed on the print job status screen in FIG. 8. When the print job in the "waiting for printing" status is selected on the screen in FIG. 8 and is canceled in print, only the selected print job is canceled. The execution of the print job other than the selected print job is not canceled.

With the image processing apparatus according to the present exemplary embodiment, the secure print job as the operation target is configured to vary depending on the operation purpose of the secure print job. Specifically, if the operation purpose of the secure print job is directed to the cancel in print, only the secure print job selected by the operator is canceled in print.

On the other hand, if the operational purpose is directed to the print operation, it is configured to be capable of executing the print of the secure print job with the user name and password same as those of the selected secure print job in addition to the secure print job selected by the operator.

Specifically, although the job selected by the operator is the same, the operation target job varies depending on the print operation or cancel operation instructed by the operator to flexibly switch the operation target job depending on the operation purpose.

The operator may select only the job whose print is not required in a plurality of the secure print jobs stored in the image processing apparatus 101 and then cancels the selected job. Thereafter, the print is possible without selecting all jobs requiring the print by the operator. As a consequence, the operability is improved for the operator.

According to the present exemplary embodiment, if the instruction on the screen in FIG. 7 indicates the "print cancel" ("cancel" in the determination in step S604), only the execution of the secure print job selected by the operator is canceled. However, although the instruction on the screen in FIG. 7 indicates "cancel print", the operator may desire to cancel the secure print jobs with the user ID same as that of the selected secure print job in a lump. In consideration of the problem, if determining "cancel" in step S604, the operation unit 219 may display an inquiry screen (not illustrated). Then, it may be inquired to the operator whether only the execution of the secure print job selected by the operator is canceled or the secure print jobs with the user ID similar to that of the secure print job selected by the operator are canceled in a lump. With the configuration, the image processing apparatus 101 is provided with high convenience for the operator.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., non-transitory computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-176046 filed Aug. 11, 2011, which is hereby incorporated by reference herein in its entirety.

What is claimed is:

1. A printing apparatus capable of causing a display unit to display information for prompting a user to perform operation, and capable of causing an image forming unit to form an image by using print data stored in a storing unit, comprising:

a controller having a processor which executes instructions stored in a memory or having circuitry, the controller being configured to perform, processing of causing the display unit to display a screen that includes a list, a first object, and a second object, the list containing plural pieces of job information corresponding to the print data stored in the storing unit, the first object being an object for giving an instruction for printing the print data, the second object being an object for giving an instruction for job information deletion from the list;

processing of, on the basis of selection of a piece of job information from the list and subsequent selection of the first object, causing the image forming unit to execute image forming operation based on print data corresponding to the selected job information and based on print data corresponding to job information that is different from the selected job information and is not selected on the list; and processing of, on the basis of selection of a piece of job information from the list and subsequent selection of the second object, deleting the selected job information only from the list without causing the image forming unit to execute image forming operation based on print data corresponding to the selected job information.

2. The printing apparatus according to claim 1, wherein the job information that is different from the selected job information, is not selected on the list, and corresponds to the print data based on which the image forming operation is executed in conjunction with the print data corresponding to the selected job information is capable of being identified on the list.

3. The printing apparatus according to claim 1, wherein the print data corresponding to job information that is different from the selected job information and is not selected on the list, and based on which the image forming operation is executed in conjunction with the print data corresponding to the selected job information, is print data that contains same user identification information as that of the print data corresponding to the selected job information.

4. The printing apparatus according to claim 3, wherein the user identification information is a user ID.

5. The printing apparatus according to claim 3, wherein the user identification information is a password.

6. A control method for a printing apparatus capable of causing a display unit to display information for prompting a user to perform operation, and capable of causing an image forming unit to form an image by using print data stored in a storing unit, comprising:

processing of causing the display unit to display a screen that includes a list, a first object, and a second object, the list containing plural pieces of job information corresponding to the print data stored in the storing unit, the first object being an object for giving an instruction for printing the print data, the second object being an object for giving an instruction for job information deletion from the list;

processing of, on the basis of selection of a piece of job information from the list and subsequent selection of the first object, causing the image forming unit to execute image forming operation based on print data corresponding to the selected job information and based on print data corresponding to job information that is different from the selected job information and is not selected on the list; and processing of, on the basis of selection of a piece of job information from the list and subsequent selection of the second object, deleting the selected job information only from the list without causing the image forming unit to execute image forming operation based on print data corresponding to the selected job information.

7. A non-transitory computer-readable storage medium for causing a computer to perform processing, the computer being used for a printing apparatus, the printing apparatus being capable of causing a display unit to display information for prompting a user to perform operation, and capable of causing an image forming unit to form an image by using print data stored in a storing unit, said processing comprising:

processing of causing the display unit to display a screen that includes a list, a first object, and a second object, the list containing plural pieces of job information corresponding to the print data stored in the storing unit, the first object being an object for giving an instruction for printing the print data, the second object being an object for giving an instruction for job information deletion from the list;

processing of, on the basis of selection of a piece of job information from the list and subsequent selection of the first object, causing the image forming unit to execute image forming operation based on print data corresponding to the selected job information and based on print data corresponding to job information that is different from the selected job information and is not selected on the list; and processing of, on the basis of selection of a piece of job information from the list and subsequent selection of the second object, deleting the selected job information only from the list without causing the image forming unit to execute image forming operation based on print data corresponding to the selected job information.

* * * * *